Patented Aug. 1, 1944

2,355,033

UNITED STATES PATENT OFFICE 2,355,033

PLASTIC COMPOSITION

Sidney Musher, New York, N. Y., assignor to Musher Foundation Incorporated, New York, N. Y., a corporation of New York No Drawing. Application June 4, 1943, Serial No. 489,690

13 Claims. (Cl. 106—154)

The present invention relates to the production of a plastic composition which has unusual body texture, and plastic characteristics.

It is a purpose of the present invention to provide a plastic material made from low cost materials which has application in industries where a heavy body, viscosity, and plasticity are desired.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, a fraction of oats is prepared by special procedures, added to a sugar solution or the oat fraction-sugar combination is added to water, and heated to an elevated temperature in order to develop the unusual plastic condition of the present invention.

This special oat fraction is quite different from oat flour or from whole oats. It is a relatively low starch, relatively high protein fraction which may be obtained after removal of the cellulosic hulls of the oats and after removal of a large portion of the relatively high starch containing oat fraction.

This particular fraction of oats is best prepared by first milling the oats to remove the cellulosic hulls and exterior, leaving the oat groats. These oat groats are then treated to remove the relatively high starch fraction and to concentrate the relatively high protein portion thereof.

In treating these groats to obtain the relatively low starch containing fraction, the groats are ground to such an extent that at least 60% and desirably 80% or more thereof will pass through a screen or mesh or bolting cloth having a fineness in excess of 60 mesh and desirably in excess of between 90 and 100 mesh. It is the residue which is left after such grinding and screening or bolting which is found to contain the properties desirable for use in accordance with the procedures of the present invention.

Apparently this effect is not evident or evidenced when the whole oats is ground and utilized as such or when the oat flour are utilized as such, because of the fact that other constituents therein greatly lessen, diminish, or render ineffective the plastic properties of the relatively high protein, relatively low starch containing, non-cellulosic oat fraction.

In the preferred procedure, the oat groats, after removal of the hull by milling processes, are pulverized and then by aspiration, bolting or screening, or both are treated so as to remove the starchy oat flour materials. This process is followed by regrinding and rescreening and bolting or aspirating until the oat flour or relatively high starch material has been largely removed whereas the relatively high protein material remains. The fraction of oats remaining will have a protein content in excess of about 20% and desirably in excess of 22%. At the same time the starch content of this fraction will be reduced to much less than the starch content of oat flour.

The oat flour fraction which is high in starch and low in protein and which is left after the production of the special oat fraction will contain about 14% to 16% protein and a substantial proportion of starch.

According to the preferred method of separating the relatively high starch fraction which is necessary in order to obtain the plactic properties in most highly developed condition, the groats are ground so that a major proportion thereof, say 60% to 90%, will have a fineness in excess of 60 mesh and desirably about 85% of the ground material will have a fineness of between 90 and 100 mesh.

The ground material is then screened, preferably through a fine silk screen to remove all particles which will not go through a 60 mesh screen and preferably which will not go through a 90 to 100 mesh screen.

The oat material which goes through the screen will contain the relatively high starch fraction, whereas the material left on the screen will be low in starch content.

This relatively coarse, low starch material may then be used in accordance with the procedures of the present invention, the unusual plastic properties being now present with the removal of the cellulosic portions and the starchy interior of the groats.

These coarser particles in which the plastic principles are concentrated may then be ground such as in a hammer or stone mill to a particle size of about 100 mesh, followed, where desired, by additional screening. Upon such further screening the plastic principles will be largely contained in the material which passes through the 90 to 100 mesh screen.

The oat fraction described in the present application and containing in excess of about 20% protein may also be prepared by other milling procedures such as by rubbing or brushing the dehulled oat groats to remove the outer surfaces, other than the hulls, followed by grinding to the desired mesh, but these procedures are not considered as satisfactory as the procedures outlined above.

Although the chemical composition may vary, it has been found in one case that this oat fraction, which has been found particularly suitable for the present invention, contains from about 22% to 29% or more protein, from about 7.5% to 10% fat, from about 2.3% to 3.5% fibre, from about 4.5% to 8.5% moisture, from about 2.5% to 4.5% ash, and from about 40% to 56% nitrogen free extract.

It has been found possible, where desired, to bleach this special oat fraction with chlorine or hypochlorites to eliminate the dark specks. It is also possible to obtain this bleaching effect with reducing agents such as sulfites but these reducing agents are not as effective as the oxidizing bleaching agents.

This special oat fraction may be heated to an elevated temperature in an aqueous dispersion in the presence of a water soluble carbohydrate to obtain a highly plastic product.

For example, from 1 to 25 parts and desirably from 5 to 10 parts of the finely divided special oat fraction are added to 100 parts of a solution containing between 25% and 65% and preferably between 35% and 55% of a water soluble carbohydrate.

The combination is then heated to an elevated temperature desirably in excess of 200° F. and preferably continuously heated until the temperature reached is between 215° F and 225° F.

As a result of heating the combination to the elevated temperature of, for example, 220° F., the product forms a plastic mass having a high viscosity and the product pulls to a long string forming thin strands of the nature of spun sugar.

The unusual plastic action given by this particular fraction of oats is given by neither oat flour nor by starch, soybean flour, wheat flour, or other cereal or seed product. For example, the special oat product which is used in accordance with the procedures of the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

This particular effect cannot be obtained with any other type of cereal or seed material other than the special fraction prepared in accordance with the procedures of the present invention nor can it be obtained except when heated to elevated temperatures with the special water soluble carbohydrate solution in accordance with the procedures outlined herein.

Among the water soluble carbohydrates which may be utilized for combination with the coarse screenings or finely ground coarse screenings are included the mono and di-saccharides such as dextrose, glucose, corn syrup, sucrose, cane sugar, beet sugar, or intermediate sugar products such as molasses, blackstrap molasses, corn sugar molasses, brown sugar, invert sugar, honey, and also including the water soluble carbohydrates which are high in dextrine or consisting substantially of dextrine.

The product obtained in accordance with the procedures of the present invention has highly desirable characteristics since it may be applied as a sizing for textiles and textile fibers as well as for paper. In connection with sizing operations, the composition of the present invention may be combined with other sizing materials such as with small amounts of starch, gelatin, sulfonated oils, etc., and may be readily washed or removed from textile fibers where desired.

The present composition is also desirable for use in the manufacture of various food products including candies, confections and gums where it may be used in replacement for egg albumen as in the manufacture of marshmallows and jelly gums and in replacement for milk solids as in the manufacture of caramels and other confections and gums. It may also be used in the manufacture of jams, ice cream, sherbets, and ices to produce unusual stabilizing properties, replacing gelatin, sodium alginate, Irish moss, locust bean gum, psyllium seed, pectin and other stabilizers commonly employed.

In printing inks, the present composition may be employed to provide a highly plastic material to serve as a carrier for inks and which when applied to paper forms a hard surface coating.

The present composition may also be used as a carrier for essential oil flavors with the essential oils homogenized in amounts between 5% and 45% in the composition of the present invention.

Vitamin oil concentrates may also be prepared by homogenizing the oil soluble vitamins including fish and fish liver oils, fish liver oil concentrates, synthetic vitamin D compositions, vitamins A and D, wheat germ oil, vitamin E, tocopherols, and other vitamin materials in the composition of the present invention in amounts between about 5% and 50%.

Furthermore, for bakery purposes such as for fillings, pies, custards and puddings, the present composition may very desirably be utilized.

The desirable results of the present invention producing the unusual plastic properties are obtained without substantial gelatinization of any of the starch contained in the finely divided special oat fraction.

Where desired, the special oat fraction may be combined in dry form with a water soluble carbohydrate and the combination added to water in the proportions set forth followed by heating to the elevated temperature to produce the desired plastic properties.

The "spinning" effect of the present composition makes it unusually desirable for the preparation of spun sugar products as in the candy and confectionery industries and the present composition may be used under different pH conditions in accordance with the requirements of the materials with which it is to be used.

The special oat fraction may first be combined with from 4 to 10 parts of an aqueous solution containing between about 10% and 40% and desirably between 20% and 30% of an alcohol such as methyl, ethyl, butyl, propyl or isopropyl alcohol, followed by removal of the insoluble portion. The soluble portion may then be concentrated, preferably by vacuum concentration to in excess of 70% total solids or to dryness by tray or drum drying. From 1 to 25 parts of this fraction may then be added to 100 parts of a solution containing between 25% and 65% and preferably between 35% and 55% of a water soluble carbohydrate, and the combination may then be heated to an elevated temperature, desirably in excess of 200° F. and preferably continuously heated until the temperature reached is between 215° F. and 225° F.

Where desired, the alcohol soluble fraction removed in the manner indicated above may be further added to a solution containing in excess of 60% of an alcohol or sufficient alcohol may be added to the alcohol soluble fraction to increase the alcohol concentration to over 60% and desirably to about 70% followed by removal of the insoluble fraction. The insoluble fraction thus separated may then be utilized for combination with a solution of a water soluble carbohydrate followed by heating to over 200° F. to develop unusual plastic properties. In addition to using water as the aqueous medium, milk including skim milk and whole milk may also be utilized.

By the term "dry milled oat product" as used in the present application and claims is meant an oat product which has been subjected to either grinding, screening or aspirating or combinations thereof but wherein the oat product has been processed in the substantial absence of water.

The present application is a continuation in part of application, Serial No. 401,967 filed July 11, 1941, entitled "Water thickening agents and methods for making the same," and Serial No. 463,651 filed October 28, 1942, entitled "Ice cream compositions."

Having described my invention, what I claim is:

1. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said dispersion including between 25 and 65 parts of a water soluble carbohydrate to each 100 parts of total water soluble carbohydrate and water.

2. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit about 80% thereof to pass through a 60 mesh screen, said dispersion including between 25 and 65 parts of a water soluble carbohydrate to each 100 parts of total water soluble carbohydrate and water.

3. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said dispersion including between 25 and 65 parts of a sugar to each 100 parts of total sugar and water.

4. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit about 80% thereof to pass through a 60 mesh screen, said dispersion including between 25 and 65 parts of a sugar to each 100 parts of total sugar and water.

5. A method of producing a plastic composition which comprises adding a small amount of the finely divided coarse fraction of dehulled oats to a substantially concentrated water soluble carbohydrate solution followed by heating to an elevated temperature until a plastic mass having a high viscosity and which pulls to a long string forming thin strands of the nature of spun sugar is formed, said solution containing between 25% and 65% of a water soluble carbohydrate, said fraction of dehulled oats being substantially free of those particles which will go through a 60 mesh screen when the dehulled oats are ground to a fineness that will permit a major proportion thereof to pass through a 60 mesh screen.

6. A method of producing a plastic composition which comprises adding a small amount of the finely divided coarse fraction of dehulled oats to a substantially concentrated water soluble carbohydrate solution followed by heating to an elevated temperature until a plastic mass having a high viscosity and which pulls to a long string forming thin strands of the nature of spun sugar is formed, said solution containing between 25% and 65% of a water soluble carbohydrate, said fraction of dehulled oats being substantially free of those particles which will go through a 60 mesh screen when the dehulled oats are ground to a fineness that will permit about 80% thereof to pass through a 60 mesh screen.

7. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said fraction containing at least 20% protein, said dispersion including between 25 and 65 parts of a water soluble carbohydrate to each 100 parts of total water soluble carbohydrate and water.

8. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said fraction containing at least 20% protein, said dispersion including between 25 and 65 parts of a sugar to each 100 parts of total sugar and water.

9. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said dispersion including between 25% and 65% of a water soluble carbohydrate and between 1 part and 25 parts of the finely ground coarse fraction to each 100 parts of the water soluble carbohydrate solution, said fraction containing at least 20% total protein.

10. A plastic composition comprising the heat plasticized finely ground coarse fraction of dehulled oats in aqueous dispersion, said fraction of dehulled oats being substantially free of those particles which will go through a 60 mesh screen when the dehulled oats are ground to a fineness that will permit a major proportion thereof to pass through a 60 mesh screen, said dispersion including between 25% and 65% of a sugar and between 1 part and 25 parts of the finely ground coarse fraction to each 100 parts of the sugar solution, said fraction containing at least 20% total protein.

11. A method of producing a plastic composition which comprises adding a small amount of the finely divided coarse fraction of dehulled oats to a substantially concentrated water soluble carbohydrate solution followed by heating to an elevated temperature until a plastic mass having a high viscosity and which pulls to a long string forming thin strands of the nature of spun sugar is formed, said solution containing between 25% and 65% of a water soluble carbohydrate, said fraction of dehulled oats being substantially free of those particles which will go through a 60 mesh screen when the dehulled oats are ground to a fineness that will permit a major proportion thereof to pass through a 60 mesh screen, said fraction containing at least 20% protein.

12. A method of producing a plastic composition which comprises adding from 1 to 25 parts of a finely divided coarse fraction of dehulled oats to 100 parts of a solution containing between 25% and 65% of a water soluble carbohydrate followed by heating to in excess of 200° F. until a plastic mass having a high viscosity and which pulls to a long string forming thin strands of the nature of spun sugar is formed, said fraction containing at least 20% total protein, said fraction of dehulled oats being substantially free of those particles which will go through a 60 mesh screen when the dehulled oats are ground to a fineness that will permit a major proportion thereof to pass through a 60 mesh screen.

13. A method of producing a plastic composition which comprises adding from 1 to 25 parts of a finely divided coarse fraction of dehulled oats to 100 parts of a solution containing between 25% and 65% of a sugar followed by heating to in excess of 200° F. until a plastic mass having a high viscosity and which pulls to a long string forming thin strands of the nature of spun sugar is formed, said fraction containing at least 20% total protein, said fraction of dehulled oats being substantially free of those particles which will go through a 60 mesh screen when the dehulled oats are ground to a fineness that will permit a major proportion thereof to pass through a 60 mesh screen.

SIDNEY MUSHER.